United States Patent Office 3,378,018
Patented Apr. 16, 1968

3,378,018
APPARATUS FOR THE RECLAMATION OF
LIQUIDS USED IN VEHICLE WASHING
Raymond L. Lawter, Zanesville, Ohio, assignor to
Dura Corporation, Oak Park, Mich., a corporation
of Michigan
Filed Sept. 27, 1965, Ser. No. 490,436
4 Claims. (Cl. 134—109)

ABSTRACT OF THE DISCLOSURE

A water reclaiming system for car washing operations in which the slurry of grit and water is drained from the car washing module into a tank from which it is pumped to a cyclone separator, the separated clean water being returned to the tank and the grit discharged. Water is pumped from the tank to the car washing module to make possible repeated use of the water.

Heretofore, a large proportion of the water used in automatic car washing systems has been lost due to inadequate and inefficient reclamation methods and this has resulted in costly and uneconomical operation. In many parts of the country where water shortages exist this is a very important consideration, and indeed renders such systems impractical to adopt where large water consumption is required.

An object is to produce a new and improved apparatus for reclaiming and treating liquids in a car washing system after they have fallen from vehicles in an efficient and economical manner so that substantially all the liquid is recovered, treated and is available for reuse.

Another object is to improve the separation of grit and other foreign particles from the water used in car washing systems so that the water can be reused with a minimum amount of loss.

A further object is to utilize a novel organization including a centrifuge for separating water used in car washing systems from suspended solids in such manner as to make available for reuse a maximum volume of reclaimed water in a short period of time.

A still further object is to provide means for treating detergent solutions employed for car washing systems so as to remove foreign particles such as dirt and silt and return the clean solutions for reuse.

A still further object is to produce a package unit for use in reclaiming water from war washing systems.

Other objects and advantages of the invention will hereinafter appear and, for purposes of illustration but not of limitation, embodiments of the invention are shown on the accompanying drawings, in which FIGURE 1 is a diagrammatic view of a water reclaiming system for use in car washing operations;

Figure 1:
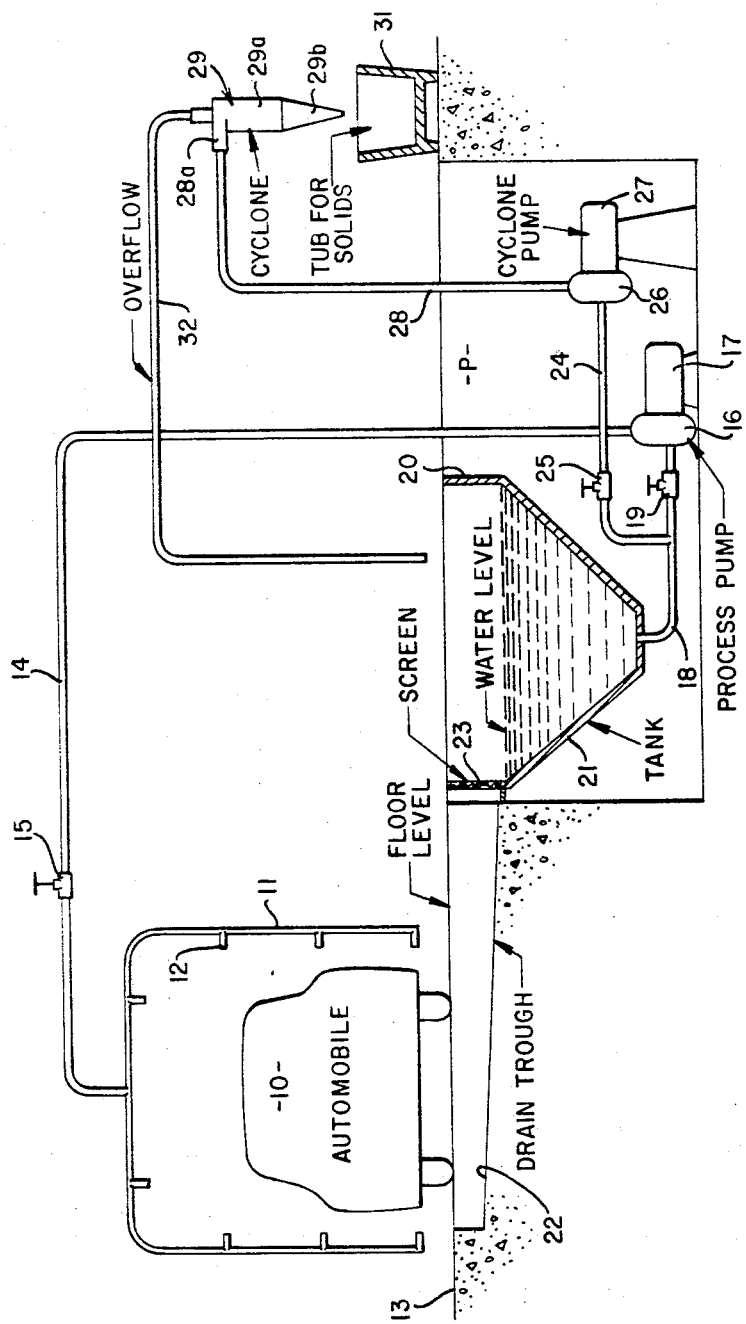
Figure 2:
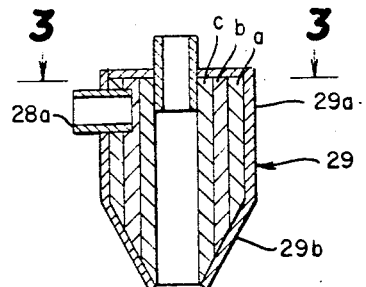
FIGURE 2 is a longitudinal sectional view of a cyclone separator, diagrammatically showing the zones of different angular velocities.
Figure 3:
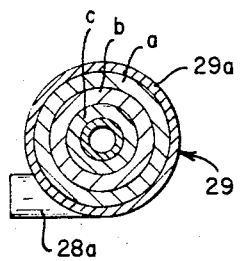
FIGURE 3 is a transverse sectional view on the line 3—3 of FIGURE 2.

The form of the invention illustrated on FIGURE 1 comprises a car washing system showing an automobile 10 disposed beneath a pipe-forming arch 11, having a series of nozzles 12 arranged so as to impinge water over the body of the automobile. The automobile 10 is shown resting upon a floor 13, over which it may be progressively advanced through various washing modules by a suitable conveyor (not shown). Water is delivered to the arch 11 by a delivery pipe 14 equipped with a manual control valve 15. The delivery pipe 14 leads from a suitable high pressure process pump 16 which may be of the centrifugal type. The pump 16 is driven by a suitable electric motor 17 and water is supplied to the pump 16 by a supply pipe 18, which has a manual control valve 19. The pipe 18 leads from the bottom of a tank or reservoir 20, which is formed with a hopper style or funnel shaped bottom 21 and is arranged in a pit P below the floor 13. Dirt-laden water or slurry from the automobile 10 falls into an inclined drain trough 22 and before entering the tank 20 passes through a suitable filter screen 23, which serves to separate out the larger foreign particles.

From the supply pipe 18, and in rear of the manual valve 19, is a branch pipe 24 equipped with a manual control valve 25, the pipe 24 leading to a high velocity pump 26 which may also be centrifugal and is driven by an electric motor 27. The pump 26 draws water from the tank 20 and forces it through a pipe 28 to a cyclone separator 29. Manifestly, when the valve 25 is closed and the valve 19 is open the pump 16 may force water from the tank 20 through the delivery pipe 14 to the spray nozzles 12 through the arch pipe 11. However, upon closing the valve 19 and opening the valve 25, then the pump 26 may draw water from the tank 20 through the pipes 18 and 24 and then deliver it to the cyclone 29 through the pipe 28. Water from the pipe 28 enters the cyclone 29 through a tangential inlet 28a at the upper end of the cyclone. The cyclone comprises an upper tubular housing portion 29a and a cone-shaped base 29b at the lower end.

In the cyclone 29 the slurry drawn from the tank spirals downward and inward and transfers to an upward spiraling column of liquid extending from the rejects outlet at the lower end to the clean water outlet at the upper end. A liquid-free column of cylindrical shape forms about the central axis. The angular velocity within the housing increases from the periphery of the housing to the liquid-free axis. This creates zones such as $a$, $b$, and $c$ of different angular velocities, the zone $c$ traveling the fastest and the zone $a$ the slowest. The dirt and foreign particles are carried downward toward the apex of the cone where they are continuously discharged through the open end or underflow and fall into a tub 31 or to any other suitable waste collecting receptacle. The clean water therefore rises to the top or overflow of the cyclone 29 and is discharged through a pipe 30, which leads to the tank 20.

From the above it will be apparent that the water and dirt from the automobile 10 fall in the form of slurry into the drain trough 22, and flow by gravity to the tank 20. En route a screen 23 separates the larger foreign particles. The hopper-like bottom 21 provides increased surface on which grit and other denser products can settle out of the water. Under some conditions it may be desirable to agitate the slurry in the tank and this can be done mechanically or pneumatically. Then the water from the tank 20 may be forced by the process pump 16 to the spray nozzles 12 through the pipes 14 and 11. However, in order to treat the water from the tank 20 and to remove the dirt particles, the slurry is forced by the pump 26 to the cyclone separator 29 which, as above described, causes the dirt and foreign particles to pass out the bottom end into a receptacle, such as the tub 31, and the clean water to pass through the overflow pipe 32 back into the tank 20. In this manner and by a simple expedient the slurry dropped from the automobile body is cleansed and returned to the tank 20 and from where it may be pumped to the spray nozzles 12 for automobile washing purposes.

Figure 4:
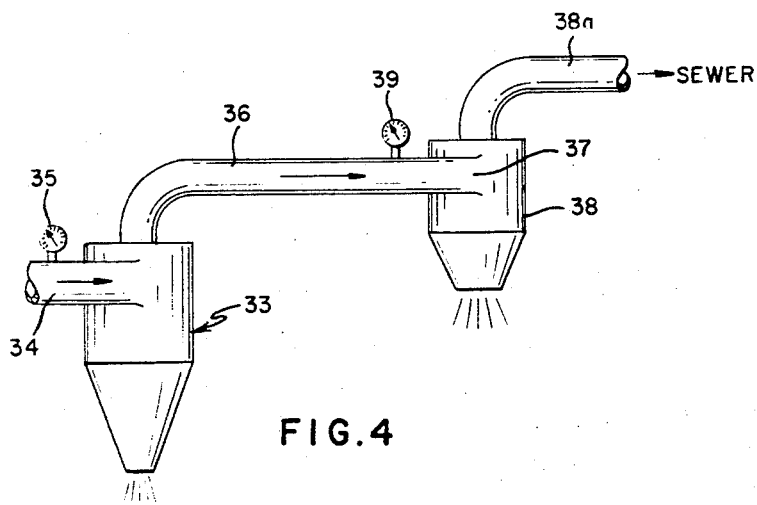
FIGURE 4 is a side elevation of a pair of cyclone separators operatively connected together.

For certain stations in the car washing system detergents are introduced and mixed with water and this presents a foaming problem, particularly in the water treatment or filtering operation. In FIGURE 4 a pair of cyclone units is shown for defoaming purposes. These units are slightly different in configuration but operate in the manner indicated above. The cyclone unit 33 receives the slurry from the pump through the tangential inlet pipe 34, which is shown equipped with a pressure gauge 35. From the overflow through which the cleaner water passes, the liquid from the unit 33 flows through a pipe 36 to the tangential inlet 37 of the cyclone unit 38, a pressure gauge 39 being shown on the inlet 37. In this case the unit 33 may operate for example at 20 p.s.i. and the unit 38 at 10 p.s.i. The underflow from the unit 33 discharges higher density products and the underflow from the unit 38 discharges defoamed overflow product and the low density foam from the top may be discharged to the sewer through the pipe 38a. Frequently it is necessary to completely defoam the liquid before discharging it.

The above described system for cleaning and reclaiming water in car washing operations greatly reduces the amount of new or make up water required for the purpose and, for locations where water is scarce or very costly, a substantial saving is effected. It is notable that the number of pumps and motors is reduced to a minimum and the employement of cyclone separators where no moving parts are required simplifies the operation and reduces the maintenance cost factors. The arrangement, selection of parts and mode of operation are such that the system can be readily handled by unskilled personnel with little instruction, so that the labor costs are maintained at a minimum.

Although the description has been directed to the washing of automobile bodies, it can be used to advantage with respect to other vehicles. Furthermore, numerous changes in details of arrangement and operation may be made without departing from the spirit of the invention, especially as defined in the appended claims.

What I claim is:

1. A water reclaiming system for car washing operations comprising:
   a tank,
   a car washing module,
   means including first pumping means and piping for pumping water from said tank to said module,
   a drain for delivering a slurry of water and grit directly from said module to said tank,
   a cyclone separator for separating grit from the slurry and discharging the grit as underflow and clean water as overflow,
   means including second pumping means and piping for pumping slurry from the lower portion of said tank to said cyclone separator,
   and piping for delivering clean water from the overflow of said cyclone separator to said tank.

2. A water reclaiming system for car washing operations as claimed in claim 1 in which said cyclone separator for detergent-mixed water comprises two units of substantially identical construction, the first unit receiving said slurry and discharging as underflow higher density products and the overflow being connected to the second unit, the underflow thereof discharging defoamed product for reuse in the system and the overflow discharging low density foam as waste.

3. A water reclaiming system for car washing operations comprising:
   a car washing module,
   a storage tank for slurry,
   a drain for delivering a slurry of water and grit from said car washing module to said storage tank,
   a cyclone separator,
   a first pump for forcing slurry from said tank at high velocity to said cyclone separator,
   pipe means leading from said tank to said first pump and leading from said first pump to said cyclone separator,
   pipe means leading from the overflow of said cyclone separator to said tank for delivering clean water thereto,
   a second pump,
   pipe means for delivering water to said car washing module from said second pump,
   pipe means from said second pump and connecting with said tank,
   valve means controlling said pipe means from said tank to said first pump,
   and valve means controlling said pipe means to said second pump.

4. A water reclaiming system for car washing operations comprising:
   a car washing module,
   a storage tank for slurry, said tank having a hopper shaped base to facilitate settling out of denser foreign particles and an outlet at the bottom,
   a drain for delivering a slurry of water and grit from said car wasing module to said storage tank,
   screening means interposed between said car washing module and said storage tank for separating out large particles of foreign matter,
   a cyclone separator,
   a first pump for forcing slurry from said tank at high velocity to said cyclone separator,
   pipe means leading from said tank to said first pump and leading from said first pump to said cyclone separator,
   pipe means leading from the overflow of said cyclone separator to said tank for delivering clean water thereto,
   a second pump,
   pipe means for delivering water to said car washing module from said second pump,
   pipe means from said second pump and connecting with said tank,
   valve means controlling said pipe means from said tank to said first pump,
   and valve means controlling said pipe means to said second pump.

References Cited

UNITED STATES PATENTS

| | | | |
|---|---|---|---|
| 2,139,096 | 12/1938 | Piquerez | 134—23 X |
| 2,922,173 | 1/1960 | Lind et al. | 134—109 X |
| 3,003,346 | 10/1961 | Morris et al. | |
| 3,003,347 | 10/1961 | Morris et al. | |

CHARLES A. WILLMUTH, *Primary Examiner.*

ROBERT L. BLEUTGE, *Examiner.*